United States Patent [19]

Hoblingre et al.

[11] Patent Number: 5,127,670
[45] Date of Patent: Jul. 7, 1992

[54] DEVICE FOR FIXING A STEERING COLUMN TO THE BODYWORK OF A MOTOR VEHICLE

[75] Inventors: André Hoblingre; Jean P. Barnabe, both of Valentigney; Frédéric Mouhot, Voujeaucourt, all of France

[73] Assignee: ECIA, France

[21] Appl. No.: 661,151

[22] Filed: Feb. 27, 1991

[30] Foreign Application Priority Data

Feb. 28, 1990 [FR] France ................ 90 02527

[51] Int. Cl.⁵ .............................................. B62D 1/16
[52] U.S. Cl. ........................................ 280/779; 74/492
[58] Field of Search ................ 280/779, 780, 777; 74/492; 248/230, 300

[56] References Cited

U.S. PATENT DOCUMENTS

| | | | |
|---|---|---|---|
| 3,760,650 | 9/1973 | Pardy | 74/492 |
| 3,813,960 | 6/1974 | Windett et al. | 74/492 |
| 4,022,495 | 5/1977 | Pizzocri | 280/750 |
| 4,746,780 | 5/1988 | Resh | 248/300 |
| 5,016,722 | 5/1991 | Morita et al. | 280/779 |

Primary Examiner—Mitchell J. Hill
Assistant Examiner—Paul Dickson
Attorney, Agent, or Firm—Sughrue, Mion, Zinn, Macpeak & Seas

[57] ABSTRACT

This device for fixing a steering column to the bodywork of a motor vehicle, in which the column (1) is connected to an assembly member (2), and this member to the bodywork (3) of the vehicle via fixing means, is characterized in that the fixing means comprise means (4) for hooking the member to the bodywork and means (5, 6) suitable for producing a mechanical stress between this member and the bodywork in order to ensure that the member is fixed under stress to the bodywork. This device advantageously comprises, in proximity to one of the ends of the member (2), the hooking means (4), in proximity to the other end of this member, means (5) for clamping the member to the bodywork, and, between these hooking and clamping means, means (6) tending to distance this member from the bodywork.

7 Claims, 2 Drawing Sheets

DEVICE FOR FIXING A STEERING COLUMN TO THE BODYWORK OF A MOTOR VEHICLE

BACKGROUND OF THE INVENTION

The present invention relates to a device for fixing a steering column to the bodywork of a motor vehicle.

A certain number of devices for fixing the column to the bodywork of a motor vehicle are already known in the prior art, in which devices the steering column is connected to an assembly member and this assembly member to the bodywork by fixing means.

These fixing means are generally formed by four screw/nut systems arranged at the four corners of the assembly member.

Upon mounting and fixing the assembly member to the bodywork of the vehicle, it is thus necessary to position this member correctly relative to the rest of the bodywork, then perform four screwing operations to fix the column to the bodywork of the vehicle.

It can be imagined that these operations are relatively complex, long and difficult inasmuch as access to the different anchorage points of this column is not always easy, particularly since the functions fulfilled by these steering columns and the various adjustment possibilities of the latter have increased their space requirement.

SUMMARY OF THE INVENTION

It is thus the object of the invention to resolve these problems by proposing a fixing device which is simple, reliable and very rapid to implement.

To this end, the subject of the invention is a device for fixing a steering column to the bodywork of a motor vehicle, in which the column is connected to an assembly member, and this member to the bodywork of the vehicle via fixing means, the fixing means comprising means for hooking the member to the bodywork and means suitable for producing a mechanical stress between this member and the bodywork in order to ensure that this member is fixed under stress to the bodywork, characterised in that, in proximity to one of the ends of the assembly member, it comprises the hooking means, in proximity to the other end of this member means for clamping the member to the bodywork, and, between these hooking and clamping means, means tending to distance this member from the bodywork.

The invention will be better understood with the aid of the description which follows, provided solely by way of example and given with reference to the attached drawings, in which:

DESCRIPTION OF A PREFERRED EMBODIMENT

Figure 1:
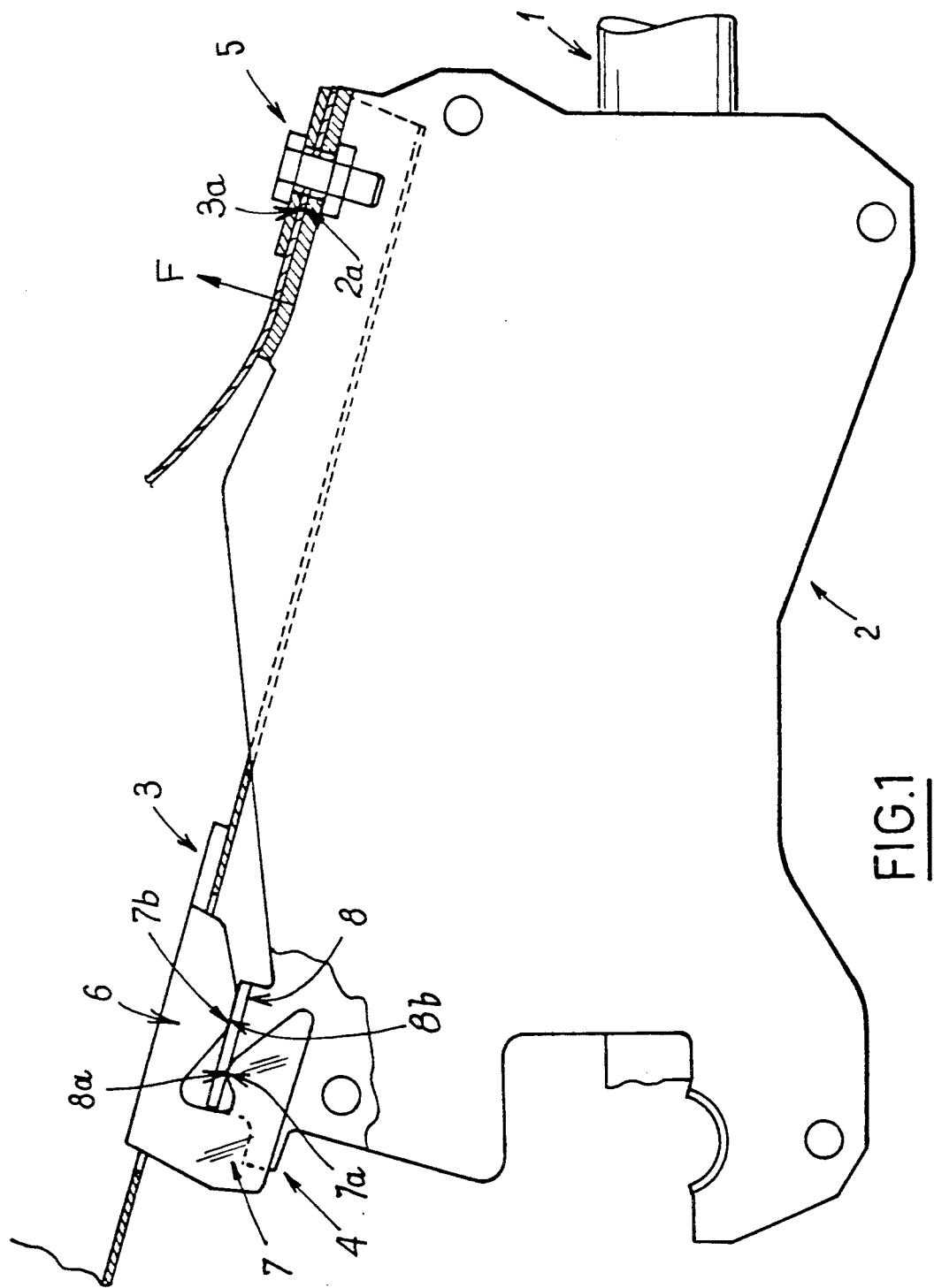
FIG. 1 represents a side view of a fixing device according to the invention.

As can be seen in these figures, a steering column 1 of a motor vehicle is connected to an assembly member 2 by any means known per se and this assembly member is connected to the rest of the vehicle bodywork, denoted by the general reference 3, by fixing means.

According to the invention, these fixing means comprise means 4 for hooking the member to the bodywork and means 5, 6 suitable for producing a mechanical stress between this member and the bodywork in order to ensure that the member is fixed under stress to the bodywork.

In the embodiment shown in these figures, the device according to the invention comprises, in proximity to one of the ends of the assembly member 2, the means 4 for hooking the assembly member to the bodywork of the vehicle and, in proximity to the other end of this member, means 5 for clamping this member to the bodywork and, between these hooking and clamping means, means 6 tending to distance this member from the bodywork.

The hooking means advantageously comprise at least one element 7 in the form of a hook suitable for cooperating with an element 8 in the form of a hook-in lug.

Figure 2:
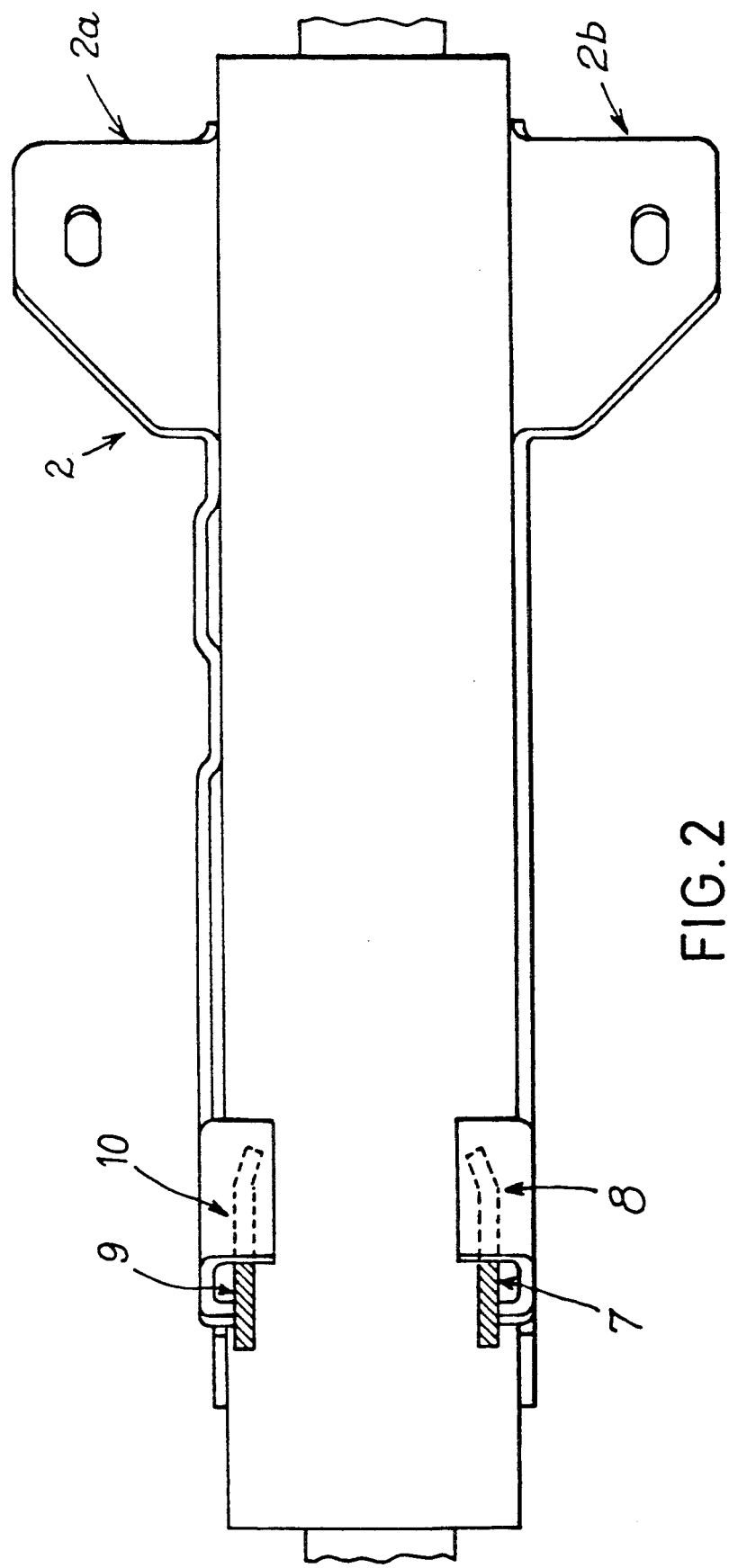
FIG. 2 represents a plan view in partial section of the fixing device according to the invention.

In the embodiment shown, an element in the form of a hook and an element in the form of a hook-in lug are provided on both sides of the assembly member 2, these different elements being denoted by the references 7, 8, 9 and 10 (FIG. 2). As can be seen in FIG. 2, the ends of the elements 7 and 9 in the form of a hook are advantageously bent back in the direction of the axis of the column to obtain better hooking reliability.

The elements in the form of a hook 7 and 9 can be connected to the rest of the bodywork of the vehicle, while the elements in the form of a hook-in lug 8 and 10 can be connected to the assembly member and are formed, for example, by projecting parts folded back towards the inside or the outside of the latter.

Of course, the opposite can likewise be provided: namely, the elements in the form of hooks can be connected to the assembly member and the elements in the form of a hook-in lug can be connected to the rest of the bodywork.

As shown more particularly in FIG. 1, the means tending to distance the assembly member from the bodywork can be formed by a boss 6 of the element 7 in the form of a hook. In this case, the element or each element in the form of a hook 7, 9 comprises a first contact zone 7a suitable for cooperating with a corresponding first contact zone 8a of the element or each element 8 in the form of a lug, and a second contact zone 7b, formed by the apex of the boss 6, opposite to and offset relative to the hook's first contact zone 7a in the direction of the clamping means 5 and suitable for cooperating with a second corresponding contact zone 8b of the element 8 or each element in the form of a lug, said zone being opposite and offset relative to the first in the direction of the clamping means in such a way as to limit the displacement of the element or each element in the form of a hook-in lug.

Moreover, the surface 2a of the assembly member 2, by which it bears on the bodywork in the region of the clamping means 5, and the corresponding bearing surface 3a of the bodywork 3 are separated or spaced apart when the element or each element in the form of a lug 8 is resting on the two contact zones 7a, 7b of the element or each element in the form of a hook, in an unclamped position, loose from the clamping means 5, in order to allow the elements in the form of a lug 8, when clamped, to be stressed between the contact zones 7a and 7b of the elements in the form of a hook 7 to ensure that this assembly member 2 is fixed under stress to the bodywork.

Indeed, as can be seen, when the assembly member 2 is displaced following the arrow F in FIG. 1, starting from the loose position, the elements of the latter in the form of a lug 8 pivot in the elements in the form of a hook until these elements in the form of a lug 8 bear, on the one hand, on the first contact surfaces 7a of these elements in the form of a hook 7 and, on the other hand, on the apices of the bosses 6, such that it is then possible by continuing the displacement of this member 2, for example by virtue of the clamping means 5, to fix this member 2 under stress to the bodywork 3 of the vehicle.

In the embodiment shown, the clamping means 5 are formed by a screw/nut system engaging, for example, in corresponding slots of lateral wings or flanges 2a and 2b (FIG. 2) of the assembly member and allowing the latter to be fixed and clamped to the bodywork. One part of these means is connected to the bodywork of the vehicle and the other to the member in order to clamp these two elements to one another.

It will thus be understood that the fixing device according to the invention consists in hooking the assembly member to the bodywork of the vehicle, then in producing a mechanical stress between this member and the bodywork in order to ensure that this member is fixed under stress to the bodywork.

It is, of course, self-evident that several different embodiments can be envisaged.

Thus, for example, the means tending to distance the assembly member from the bodywork, formed by the boss 6 in this embodiment, can likewise be formed by resilient means such as a spring. Moreover, hooking means can likewise be provided at both ends of the assembly member, the generation of a mechanical stress between this member and the bodywork then being ensured, for example, by a cam bearing, on the one hand, on the bodywork and, on the other hand, on the assembly member and being displaceable between a position for mounting the member and an active position for producing the mechanical stress.

What is claimed is:

1. A device only for undetachably fixing a steering column to bodywork of a motor vehicle, in which the column (1) is directly connected to an assembly member (2), which forms no part of the steering column itself and which is directly connected to the bodywork (3) of the vehicle via fixing means, the fixing means comprising hooking means (4) for hooking the assembly member directly to the bodywork, and means (5, 6) for producing a mechanical stress between the assembly member and the bodywork in order to ensure that the assembly member is fixed under stress to the bodywork, said device comprising:

in proximity to one of opposite ends of the assembly member (2), the hooking means (4);

in proximity to the other end of the assembly member, means (5) for clamping the assembly member directly to the bodywork; and between said hooking and clamping means, means (6) tending to space the assembly member (2) from the bodywork (3).

2. Device according to claim 1, characterized in that the hooking means comprises at least one hook (7, 9) and at least one hook-in lug (8, 10) wherein said at least one hook cooperates with said at least one hook-in lug.

3. Device according to claim 2, characterized in that the hooking means comprise a hook (7, 9) and a hook-in lug (8, 10) on both sides of the assembly member.

4. Device according to claim 2 or 3, characterized in that the at least one hook or each hook (7, 9) is connected to the bodywork of the vehicle (3) while the at least one hook-in lug or each hook-in lug (8, 10) is connected to the assembly member (2).

5. Device according to claim 4, characterized in that the at least one hook or each hook (7) comprises:

a first hook contact zone (7a) for cooperating with at corresponding first lug contact zone (8a) of the at least one hook-in lug or each hook-in lug (8); and a second hook contact zone (7b), opposite the first hook contact zone (7a) and offset relative thereto in the direction of the clamping means (5), for cooperating with a corresponding second lug contact zone (8b), of the at least one hook-in lug or each hook-in lug (8), said second lug contact zone (8b) being opposite the first lug contact zone (8a) and offset relative thereto in the direction of the clamping means;

wherein a bearing surface (2a) of the assembly member and a corresponding bearing surface (3a) of the bodywork, in the region of the clamping means (5), are spaced apart, when the at least one hook-in lug or each hook-in lug (8) is bearing on the two hook contact zones (7a, 7b) of the at least one hook or each hook (7), in an unclamped position loose from the clamping means (5), in order, upon clamping, to allow the at least one hook-in lug or each hook-in lug (8) to be stressed between the hook contact zones (7a, 7b) of the at least one hook or each hook (7) and thus allow the assembly member to be fixed under stress to the bodywork.

6. Device according to claim 5, characterized in that the second hook contact zone (7b) of the at least one hook or each hook (7) is formed by an apex of a boss (6) of the at least one hook or each hook, said apex being opposite and offset in the direction of the clamping means relative to the first hook contact zone (7a) of said at least one hook or each hook.

7. Device according to claim 6, characterized in that the clamping means (5) comprise at least one screw/nut system, one part of which is connected to the bodywork of the vehicle and the other to the assembly member.

* * * * *